(12) United States Patent
Richardson

(10) Patent No.: US 10,814,683 B2
(45) Date of Patent: *Oct. 27, 2020

(54) SYSTEM FOR TIRE INFLATION

(71) Applicant: Aperia Technologies, Inc., Burlingame, CA (US)

(72) Inventor: Brandon Richardson, Burlingame, CA (US)

(73) Assignee: Aperia Technologies, Inc., Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,998

(22) Filed: Feb. 15, 2019

(65) Prior Publication Data

US 2019/0176548 A1 Jun. 13, 2019

Related U.S. Application Data

(62) Division of application No. 15/696,816, filed on Sep. 6, 2017, now Pat. No. 10,245,908.

(Continued)

(51) Int. Cl.
*B60C 23/10* (2006.01)
*B60C 23/12* (2006.01)

(Continued)

(52) U.S. Cl.
CPC .............. *B60C 23/10* (2013.01); *B60C 23/00* (2013.01); *B60C 23/12* (2013.01); *F04B 35/01* (2013.01);

(Continued)

(58) Field of Classification Search
CPC .. F04B 35/01; F04B 9/06; F04B 17/06; F04B 35/04; F04B 35/06; F04B 9/047;

(Continued)

(56) References Cited

U.S. PATENT DOCUMENTS 1,358,524 A 11/1920 Cooper
1,448,248 A 3/1923 Anthony
(Continued)

FOREIGN PATENT DOCUMENTS

CA 2440255 A1 3/2005
CN 2202665 Y 7/1995
(Continued)

OTHER PUBLICATIONS

European Search Report for Application No. 17849444.9 dated Feb. 28, 2020.
(Continued)

*Primary Examiner* — Kenneth J Hansen
(74) *Attorney, Agent, or Firm* — Jeffrey Schox; Diana Lin

(57) ABSTRACT

A system for tire inflation including a drive mechanism defining a rotational axis, including an eccentric mass that offsets a center of mass of the drive mechanism from the rotational axis along a radial vector; a pump arranged radially distal the rotational axis of the drive mechanism, including a chamber defining a chamber lumen, and a reciprocating element arranged at least partially within the chamber lumen and translatable along a pump axis; a drive coupler coupled between the drive mechanism at a first position and the reciprocating element at a second position fixed to the reciprocating element; a torque regulation mechanism; and a controller, communicatively coupled to the torque regulation mechanism; wherein the system is operable between at least a first mode and a second mode by the torque regulation mechanism in cooperation with the controller.

20 Claims, 4 Drawing Sheets

Related U.S. Application Data

(60) Provisional application No. 62/519,061, filed on Jun. 13, 2017, provisional application No. 62/383,910, filed on Sep. 6, 2016.

(51) Int. Cl.
    *F04B 35/01*          (2006.01)
    *F04B 35/04*          (2006.01)
    *F04B 39/00*          (2006.01)
    *B60C 23/00*         (2006.01)

(52) U.S. Cl.
CPC .......... *F04B 35/04* (2013.01); *F04B 39/0005* (2013.01); *F04B 2203/0207* (2013.01)

(58) Field of Classification Search
CPC ......... B60C 23/10; B60C 23/12; B60S 3/047; F03G 3/06
See application file for complete search history.

(56) References Cited

U.S. PATENT DOCUMENTS

| | | |
|---|---|---|
| 2,089,297 A | 8/1937 | Read et al. |
| 2,202,665 A | 5/1940 | Metz |
| 2,211,935 A | 8/1940 | Parker |
| 2,415,618 A | 2/1947 | West |
| 2,440,255 A | 4/1948 | Forrest |
| 2,496,691 A | 2/1950 | Berry |
| 2,899,907 A | 8/1959 | Becher |
| 2,962,119 A | 11/1960 | White |
| 3,012,820 A | 12/1961 | King |
| 3,047,339 A | 7/1962 | Hamer |
| 3,152,553 A | 10/1964 | Sverker |
| 3,175,507 A | 3/1965 | Sverker |
| 3,249,059 A | 5/1966 | Renn |
| 3,400,074 A | 9/1968 | Grenci |
| 3,452,801 A | 7/1969 | Fletcher et al. |
| 3,511,294 A | 5/1970 | Bepristis et al. |
| 3,532,449 A | 10/1970 | Garton |
| 3,730,215 A | 5/1973 | Conery et al. |
| 3,886,974 A | 6/1975 | Bjorklund |
| 3,981,633 A | 9/1976 | Wall |
| 4,018,579 A | 4/1977 | Hofmann |
| 4,030,300 A | 6/1977 | Thompson |
| 4,042,446 A | 8/1977 | Lawton |
| 4,095,923 A | 6/1978 | Cullis |
| 4,121,472 A | 10/1978 | Vural et al. |
| 4,157,530 A | 6/1979 | Merz |
| 4,256,971 A | 3/1981 | Griffith |
| 4,291,235 A | 9/1981 | Bergey et al. |
| 4,370,894 A | 2/1983 | Sturesson |
| 4,460,006 A | 7/1984 | Kolze |
| 4,536,668 A | 8/1985 | Boyer |
| 4,606,710 A | 8/1986 | Maguire |
| 4,637,152 A | 1/1987 | Roy |
| 4,651,792 A | 3/1987 | Taylor |
| 4,744,399 A | 5/1988 | Magnuson et al. |
| 4,768,542 A | 9/1988 | Morris |
| 4,807,487 A | 2/1989 | Seidl |
| 4,819,593 A | 4/1989 | Bruener et al. |
| 4,852,528 A | 8/1989 | Richeson et al. |
| 4,893,459 A | 1/1990 | Orlando |
| 4,895,199 A | 1/1990 | Magnuson et al. |
| 4,910,148 A | 3/1990 | Sorensen et al. |
| 4,922,984 A | 5/1990 | Dosjoub et al. |
| 5,018,797 A | 5/1991 | Takata |
| 5,052,456 A | 10/1991 | Dosjoub |
| 5,173,038 A | 12/1992 | Hopfensperger et al. |
| 5,201,968 A | 4/1993 | Renier |
| 5,293,919 A | 3/1994 | Olney et al. |
| 5,325,902 A | 7/1994 | Loewe et al. |
| 5,342,177 A | 8/1994 | Cheng |
| 5,370,711 A | 12/1994 | Audit et al. |
| 5,375,984 A | 12/1994 | Wehling |
| 5,388,470 A | 2/1995 | Marsh |
| 5,409,049 A | 4/1995 | Renier |
| 5,413,159 A | 5/1995 | Olney et al. |
| 5,429,927 A | 7/1995 | Afseth et al. |
| 5,468,129 A | 11/1995 | Sunden et al. |
| 5,482,447 A | 1/1996 | Sunden et al. |
| 5,495,879 A | 3/1996 | Cabestrero |
| 5,512,439 A | 4/1996 | Hornes et al. |
| 5,525,493 A | 6/1996 | Hornes et al. |
| 5,538,062 A | 7/1996 | Stech |
| 5,591,281 A | 1/1997 | Loewe |
| 5,646,727 A | 7/1997 | Hammer et al. |
| 5,667,606 A | 9/1997 | Renier |
| 5,707,215 A | 1/1998 | Olney et al. |
| 5,759,820 A | 6/1998 | Hornes et al. |
| 5,894,757 A | 4/1999 | Sully |
| 5,941,692 A | 8/1999 | Olney et al. |
| 5,941,696 A | 8/1999 | Fenstermacher et al. |
| 5,947,696 A | 9/1999 | Baumgarten |
| 6,092,545 A | 7/2000 | Bedore et al. |
| 6,144,295 A | 11/2000 | Adams et al. |
| 6,267,450 B1 | 7/2001 | Gamble |
| 6,360,768 B1 | 3/2002 | Galler |
| 6,463,798 B2 | 10/2002 | Niekerk et al. |
| 6,474,832 B2 | 11/2002 | Murray |
| 6,482,592 B1 | 11/2002 | Lundeberg et al. |
| 6,494,693 B1 | 12/2002 | Sunden |
| 6,663,348 B2 | 12/2003 | Schwarz et al. |
| 6,742,386 B1 | 6/2004 | Larson |
| 6,744,356 B2 | 6/2004 | Hamilton et al. |
| 6,787,233 B1 | 9/2004 | Molteberg et al. |
| 6,814,547 B2 | 11/2004 | Childers et al. |
| 6,871,683 B2 | 3/2005 | Cobb |
| 6,984,702 B2 | 1/2006 | Fonnum et al. |
| 6,986,913 B2 | 1/2006 | Fonnum et al. |
| 6,994,136 B2 | 2/2006 | Stanczak |
| 7,013,931 B2 | 3/2006 | Toit |
| 7,029,576 B2 | 4/2006 | Siegfriedsen |
| 7,117,731 B2 | 10/2006 | Hrabal |
| 7,160,707 B2 | 1/2007 | Fonnum et al. |
| 7,173,124 B2 | 2/2007 | Deggerdal et al. |
| 7,217,762 B1 | 5/2007 | Joergedal et al. |
| 7,222,487 B1 | 5/2007 | Hinkley |
| 7,225,845 B2 | 6/2007 | Ellmann |
| 7,237,590 B2 | 7/2007 | Loewe |
| 7,255,323 B1 | 8/2007 | Kadhim |
| 7,302,837 B2 | 12/2007 | Wendte |
| 7,357,164 B2 | 4/2008 | Loewe |
| 7,498,683 B2 | 3/2009 | Landwehr |
| 7,506,663 B2 | 3/2009 | Thomas et al. |
| 7,581,576 B2 | 9/2009 | Nakano |
| 7,607,465 B2 | 10/2009 | Loewe |
| 7,614,474 B2 | 11/2009 | Yang |
| 7,625,189 B2 | 12/2009 | Cheng |
| 7,704,057 B2 | 4/2010 | Malbec et al. |
| 7,748,422 B2 | 7/2010 | Bol |
| 7,763,689 B2 | 7/2010 | Fonnum et al. |
| 7,784,487 B2 | 8/2010 | Arnett |
| 7,784,513 B2 | 8/2010 | Loewe |
| 7,810,582 B2 | 10/2010 | Webb |
| 7,828,095 B2 | 11/2010 | Murata et al. |
| 7,828,101 B2 | 11/2010 | Radtke et al. |
| 7,847,421 B2 | 12/2010 | Gardner et al. |
| 7,856,871 B2 | 12/2010 | Mancosu et al. |
| 7,927,170 B2 | 4/2011 | Bickerton et al. |
| 7,931,061 B2 | 4/2011 | Gonska et al. |
| 7,931,817 B2 | 4/2011 | Bilski |
| 7,975,789 B2 | 7/2011 | Murata |
| 7,985,340 B2 | 7/2011 | Almaasbak et al. |
| 7,989,614 B2 | 8/2011 | Deggerdal et al. |
| 7,989,975 B2 | 8/2011 | Clement et al. |
| 8,004,104 B2 | 8/2011 | Hench |
| 8,022,561 B2 | 9/2011 | Ciglenec et al. |
| 8,038,987 B2 | 10/2011 | Fonnum et al. |
| 8,042,586 B2 | 10/2011 | Losey et al. |
| 8,083,503 B2 | 12/2011 | Voltenburg et al. |
| 8,110,351 B2 | 2/2012 | Bosnes |
| 8,113,254 B2 | 2/2012 | Benedict |
| 8,186,402 B2 | 5/2012 | Eigenbrode |

(56) References Cited

U.S. PATENT DOCUMENTS

| | | |
|---|---|---|
| 8,581,433 B2 | 11/2013 | Sidenmark |
| 8,646,426 B2 | 2/2014 | Finkenbiner |
| 8,747,084 B2 | 6/2014 | Richardson et al. |
| 8,801,910 B2 | 8/2014 | Bazant et al. |
| 9,039,386 B2 | 5/2015 | Richardson et al. |
| 9,039,392 B2 | 5/2015 | Richardson et al. |
| 9,074,595 B2 | 7/2015 | Richardson |
| 9,145,887 B2 | 9/2015 | Richardson |
| 9,151,288 B2 | 10/2015 | Richardson et al. |
| 2001/0000305 A1 | 4/2001 | Murray |
| 2002/0092346 A1 | 7/2002 | Niekerk et al. |
| 2003/0021693 A1* | 1/2003 | Schwarz ............... F04B 35/045 417/12 |
| 2003/0109657 A1 | 6/2003 | Fonnum et al. |
| 2004/0007302 A1 | 1/2004 | Hamilton et al. |
| 2004/0050760 A1 | 3/2004 | Siegfriedsen |
| 2004/0216827 A1 | 11/2004 | Stanczak |
| 2005/0014001 A1 | 1/2005 | Fonnum et al. |
| 2005/0067207 A1 | 3/2005 | Radtke et al. |
| 2005/0126273 A1 | 6/2005 | Hrabal |
| 2005/0147822 A1 | 7/2005 | Fonnum et al. |
| 2005/0239068 A1 | 10/2005 | Bosnes |
| 2006/0055174 A1 | 3/2006 | Landwehr |
| 2006/0102268 A1 | 5/2006 | Loewe |
| 2006/0118224 A1 | 6/2006 | Ellmann |
| 2006/0169349 A1 | 8/2006 | Nakano |
| 2007/0018458 A1 | 1/2007 | Martinez |
| 2007/0020130 A1 | 1/2007 | Malbec et al. |
| 2007/0040135 A1 | 2/2007 | Dyer et al. |
| 2007/0068238 A1 | 3/2007 | Wendte |
| 2007/0107822 A1 | 5/2007 | Loewe |
| 2007/0148022 A1 | 6/2007 | Cheng |
| 2007/0151648 A1 | 7/2007 | Loewe |
| 2007/0175831 A1 | 8/2007 | Almaasbak et al. |
| 2008/0003110 A1 | 1/2008 | Isono |
| 2008/0017256 A1 | 1/2008 | Thomas et al. |
| 2008/0035399 A1 | 2/2008 | Murata et al. |
| 2008/0135151 A1 | 6/2008 | Loewe |
| 2008/0149404 A1 | 6/2008 | Yang |
| 2008/0174120 A1 | 7/2008 | Gardner et al. |
| 2008/0190535 A1 | 8/2008 | Concu |
| 2008/0247883 A1 | 10/2008 | Yokomachi et al. |
| 2008/0289739 A1 | 11/2008 | Bol |
| 2008/0300396 A1 | 12/2008 | Deggerdal et al. |
| 2008/0308330 A1 | 12/2008 | Murata |
| 2009/0008942 A1 | 1/2009 | Clement et al. |
| 2009/0048733 A1 | 2/2009 | Isono |
| 2009/0087325 A1 | 4/2009 | Voltenburg et al. |
| 2009/0126997 A1 | 5/2009 | Webb |
| 2009/0151835 A1 | 6/2009 | Manning |
| 2009/0188310 A1 | 7/2009 | Mancosu et al. |
| 2009/0206024 A1 | 8/2009 | Bilski |
| 2009/0256532 A1 | 10/2009 | Ciglenec et al. |
| 2009/0301575 A1 | 12/2009 | Arnett |
| 2009/0311941 A1 | 12/2009 | Bickerton et al. |
| 2010/0102564 A1 | 4/2010 | Hench |
| 2010/0147429 A1 | 6/2010 | Gonska et al. |
| 2010/0243121 A1 | 9/2010 | Eigenbrode |
| 2011/0018275 A1 | 1/2011 | Sidenmark |
| 2011/0061621 A1 | 3/2011 | Finkenbiner |
| 2011/0146867 A1 | 6/2011 | Benedict |
| 2011/0146868 A1 | 6/2011 | Losey et al. |
| 2011/0308953 A1 | 12/2011 | Bazant et al. |
| 2012/0020822 A1 | 1/2012 | Richardson et al. |
| 2013/0251552 A1* | 9/2013 | Richardson ........... B60C 23/003 417/321 |
| 2013/0251553 A1 | 9/2013 | Richardson et al. |
| 2014/0000755 A1 | 1/2014 | Richardson et al. |
| 2014/0023518 A1 | 1/2014 | O'Brien et al. |
| 2014/0186195 A1* | 7/2014 | Richardson ............. B60S 5/043 417/221 |
| 2014/0260969 A1 | 9/2014 | Richardson |
| 2015/0239309 A1 | 8/2015 | Root |
| 2015/0367693 A1 | 12/2015 | Richardson et al. |
| 2016/0167465 A1 | 6/2016 | Hinque |
| 2017/0015159 A1 | 1/2017 | Richardson |
| 2018/0065429 A1 | 3/2018 | Richardson |
| 2018/0104994 A1 | 4/2018 | Lin et al. |

FOREIGN PATENT DOCUMENTS

| | | |
|---|---|---|
| CN | 2496691 Y | 6/2002 |
| CN | 101415946 A | 4/2009 |
| DE | 1042446 B | 10/1958 |
| DE | 4042446 A1 | 7/1992 |
| DE | 19739144 A1 | 3/1999 |
| GB | 530005 A | 12/1940 |
| GB | 2089297 A | 6/1982 |
| JP | 2005231573 A | 9/2005 |
| KR | 20070098639 A | 10/2007 |
| KR | 20080039578 A | 5/2008 |
| KR | 20140003969 U | 6/2014 |
| WO | 2009034321 A1 | 3/2009 |
| WO | 2009110001 A1 | 9/2009 |
| WO | 2012012617 A2 | 1/2012 |

OTHER PUBLICATIONS

International Search Report and Written Opinion of the ISA for application No. PCT/US19/63088 dated Apr. 9, 2020.

* cited by examiner

SYSTEM FOR TIRE INFLATION

CROSS-REFERENCE TO RELATED APPLICATIONS

This application is a divisional of U.S. patent application Ser. No. 15/696,816 filed 6 Sep. 2017 which claims the benefit of U.S. Provisional Application Ser. No. 62/383,910, filed 6 Sep. 2016, and U.S. Provisional Application Ser. No. 62/519,061, filed 13 Jun. 2017, each of which is incorporated herein in its entirety by this reference. This application is related to U.S. application Ser. No. 15/280,737 filed 29 Sep. 2016, which is incorporated herein in its entirety by this reference.

TECHNICAL FIELD

This invention relates generally to the pumping field, and more specifically to a new and useful tire-mounted pumping system in the pumping field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
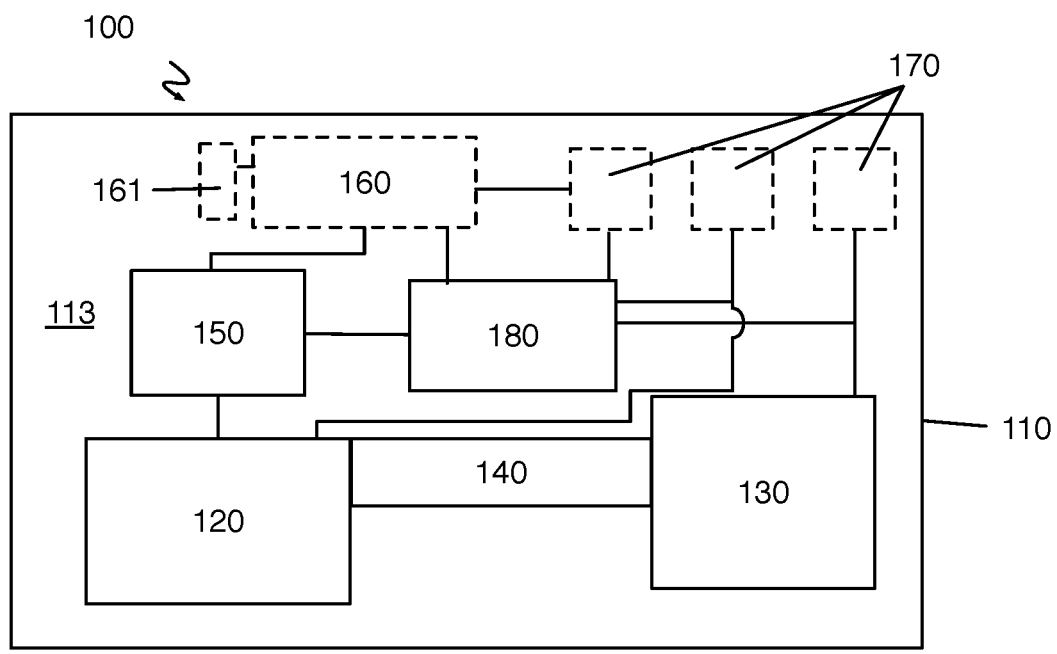
FIG. 1 is a schematic representation of the tire inflation system.

As shown in FIG. 1, the system for tire inflation 100 includes a drive mechanism 120, a primary pump 130, a drive coupler 140, and a torque regulation mechanism 150. The system can optionally include an energy storage device 160, one or more sensors 170, and a controller 180. In a variation, the drive mechanism 120 includes a cam 122 and an eccentric mass 121, the primary pump 130 includes a reciprocating element 131 and a pump body 132, and the torque regulation mechanism 150 includes a first portion 151 (e.g., a stator) and a second portion 152 (e.g., a rotor).

The system functions to inflate a tire. The system can also function to translate rotational motion into reciprocating linear motion that can be used to drive a tire inflator (e.g., a pump). The system can also function to translate relative motion between the primary pump 130 and cam 122 into a pumping force, wherein the eccentric mass 121 retains the cam 122 position relative to a gravity vector while the primary pump 130 rotates relative to the cam 122. The system can be operable between several modes, including a pumping (e.g., active) mode and a freewheeling (e.g., passive) mode. In the pumping mode, the tire inflation system 100 preferably pumps an external fluid, such as air, into the tire interior. The external fluid is preferably received from a first reservoir 910 (e.g., the external environment, a canister, etc.) during a recovery stroke of the primary pump 130 and pumped into a second reservoir (e.g., the tire) during a compression stroke of the primary pump 130. However, the fluid can be otherwise suitably pumped. The first reservoir 910 is preferably the ambient atmosphere at a first pressure, and the second reservoir is preferably the tire interior (e.g., bladder) at a second pressure higher than the first pressure. However, the first and second reservoirs can be any other suitable fluid reservoirs at any other suitable absolute and/or relative pressures. In further alternatives, the fluid can be a fluid other than air (e.g., liquid water, pure nitrogen, etc.).

In a first variation of the freewheeling mode, the eccentric mass 121 of the drive mechanism 120 rotates at substantially the same velocity as the wheel (and, thus, as the primary pump 130) such that a negligible (e.g., zero, substantially zero) drive force is supplied by the drive mechanism 120 to the primary pump 130. In the first variation, the torque regulation mechanism 150 can supply a torque to the eccentric mass 121 to excite the mass into rotation about a rotation axis (e.g., of the wheel hub) at the same velocity (e.g., substantially the same, exactly the same) as the wheel, whereupon angular momentum of the eccentric mass 121 substantially maintains the eccentric mass 121 in rotation. Upon excitation of the eccentric mass 121 into rotation at the same velocity as the wheel, the torque regulation mechanism 150 can cease supplying the torque. However, in an alternative implementation of the first variation of the freewheeling mode, the torque regulation mechanism 150 can supply a torque (e.g., continuously, periodically, asynchronously, etc.) to maintain the eccentric mass 121 in rotation about the rotation axis at a suitable velocity such that a negligible drive force is supplied by the drive mechanism 120 to the primary pump 130.

In a second variation of the freewheeling mode, the eccentric mass 121 can be statically connected to the system housing 110 and/or wheel. In the second variation of the freewheeling mode, the eccentric mass 121 rotates along with the housing 110 at the wheel speed, acted upon by a mechanical force supplied by the static connection. For example, the eccentric mass 121 can be clipped, latched, buckled, snapped, or otherwise suitably fastened to the housing 110 and/or any portion of the system or system-related component rotating along with the wheel (e.g., in a reference frame rotating at the same angular velocity as the wheel). However, the eccentric mass 121 can be otherwise suitably statically connected to the system housing 110 and/or wheel in the second variation of the freewheeling mode.

In a third variation of the freewheeling mode, the eccentric mass 121 can be rotationally decoupled from (e.g., rotates freely relative to) the system housing 110 and/or wheel. In the third variation of the freewheeling mode, rotation of the eccentric mass 121 (e.g., when rotationally decoupled) does not supply a drive force to the primary pump 130 via the cam 122 and drive coupler 140. For example, the system can include a clutch that can engage and disengage the eccentric mass 121 from the cam 122, wherein the eccentric mass 121 and the cam 122 are disengaged during system operation in the freewheeling mode, and engaged in the pumping mode. In another example, the system can include a clutch that can engage and disengage the cam 122 from the drive coupler 140, wherein the cam 122 and the drive coupler 140 are disengaged during system operation in the freewheeling mode, and engaged in the pumping mode. However, in the third variation of the freewheeling mode, the system can additionally or alternatively include any suitable mechanism for rotationally decoupling the drive mechanism 120 from the primary pump 130.

In a fourth variation of the freewheeling mode, the eccentric mass 121 is maintained at a hanging angle of substantially zero degrees relative to a gravity vector, such that no reciprocating action is produced by the cam 122 upon the reciprocating element 131 of the primary pump 130. In the fourth variation, the eccentric mass 121 is preferably maintained at a zero hanging angle by the torque regulation mechanism 150, but can additionally or alternatively be otherwise suitably maintained at a zero hanging angle (e.g., by a locking mechanism).

The system is preferably operable between the pumping and freewheeling modes by the torque regulation mechanism 150 in cooperation with the controller 180. Controller 180 operation can include generating control instructions based on any suitable control algorithm, and incorporating any suitable sensor inputs. The control instructions can be generated in real-time, near-real time, or at any suitable time. The control instructions and/or parameter values thereof can be selected (e.g., from a database) based on the sensor input values or patterns (e.g., eccentric mass angular kinematics, system lateral kinematics, vehicle kinematics, etc.), calculated (e.g., target operation values calculated based on the sensor input values), optimized (e.g., for pumping, energy harvesting, eccentric mass rotational frequency, etc.), or otherwise determined. However, the system can be otherwise suitably operable between any suitable operating modes by any suitable control and/or regulation mechanism.

The tire inflation system 100 preferably discontinuously inflates the tire (e.g. via periodic inflation, wheel speed-controlled inflation, actively controlled inflation, pressure-dependent inflation, etc.), but may continuously inflate the tire. The tire inflation system 100 is preferably powered by a direct mechanical linkage to the rotating wheel, such that the inflation system pumps fluid into the tire when the tire rotates; but the tire inflation system 100 can alternatively be powered by an actuator that is decoupled from the rotation of the tire (e.g., an electric motor having a separate power source). The tire inflation system 100 can pump fluid using a diaphragm system, a peristaltic system, a piston system, or any other suitable pumping mechanism. The tire inflation system 100 preferably mounts to a wheel (e.g. to the hub of a wheel), and preferably connects to the tire interior through a valve of the tire. The tire inflation system 100 is preferably configured to be mounted to the wheel for an extended period of time (e.g., on the order of weeks, months, or years); accordingly, removal of the tire inflation system 100 for routine tire pressure checks can be omitted.

2. Benefits

Variants of the systems and/or methods can confer several benefits and/or advantages. First, variants of the system can provide improved resistance to entering an undesired spin condition in which the eccentric mass 121 rotates at substantially the same angular velocity as the wheel (e.g., the freewheeling mode) when reciprocal pumping is desired, by providing torque input to the eccentric mass 121 via the torque regulation mechanism 150. The torque input can be modulated to provide a counter-force to torque ripple caused by the reciprocating pump (e.g., a back torque acting upon the eccentric mass 121), to provide a counter-force to large back torques produced by the primary pump 130 during the compression stroke when the system is operated at low vehicle speeds and/or starting from a stopped state (e.g., zero velocity), and/or to provide a counter-force to transient forces resulting from road and/or driving irregularities (e.g., bumps, undulations, vehicle acceleration and deceleration, etc.). This can, in turn, actively increase the amount of time during driving in which the system can usefully pump air using energy harvested from the eccentric mass 121.

Second variants of the system can enable the tire inflation system 100 to be controllable (e.g., actively controllable) between the pumping and freewheeling modes, by transitioning the pendulum (e.g., eccentric mass 121) into the freewheeling mode (e.g., wherein the pendulum is rotating at the wheel rotation speed) during periods in which the tire does not require inflation. By operating in the freewheeling mode during periods in which the tire(s) do not require inflation, wear on system components (e.g., reciprocating pump components) can be reduced and the maintenance-free system lifetime can be thus increased. The torque regulation mechanism 150 (e.g., in cooperation with a control system) can also actively transition the system into the pumping mode, by providing a torque against the eccentric mass 121 to control the hanging angle of the eccentric mass 121 relative to a gravity vector (e.g., to stop the eccentric mass 121 from rotating at the wheel rotation speed). In one variation, this includes: determining the wheel rotation speed and controlling electric motor rotor rotation to substantially match the wheel rotation speed. In a second variation, this includes: determining the eccentric mass 121 angle relative to the gravity vector, determining a desired angle, and controlling the electric motor (e.g., the electric motor rotation speed, the angular position of the electric motor, the current or voltage supplied to the electric motor, etc.) to adjust the eccentric mass 121 angle to substantially match the desired angle. However, the system can be otherwise transitioned into the pumping mode. By transitioning into the pumping mode without relying on a passive exit from the freewheeling mode (e.g., due to normal perturbations to the rotary motion arising from road surface irregularities and/or driving behavior), fluid can be provided to the tires on demand (e.g., when tires require immediate inflation, imminent inflation, etc.).

Third, variants of the system can confer several benefits related to on-demand, real-time tire inflation. Tires that are properly inflated improve vehicle fuel economy, and have longer lifetimes before replacement becomes necessary. Adjustable tire pressure in real or near-real time also enables adjustment of tire parameters (e.g., compressibility) to road and/or environmental conditions. For example, the tire pressure can be increased to take advantage of reduced rolling resistance on recently paved, smooth roads where the risk of a tire rupture due to road roughness is low. In another example, tire pressure can be automatically adjusted to account for changes in ambient pressure and/or temperature, such that an optimal pressure difference between the interior and exterior of the vehicle tire(s) is maintained.

Fourth, variants of the system can be distributed at each wheel of the vehicle (or a subset of wheels of the vehicle), which can reduce the cost of an auto-inflation system compared to a centralized inflation system and can enable the control of tire pressure on a per-wheel basis without the need for complex and expensive plumbing, valve networks, and/or pressurized fluid manifolds. Performing pressurization at the wheel-end can also reduce the likelihood of pressure system failure due to a reduction in the number of pressurized system components, which can be vulnerable to shock and vibration damage when routed beneath a vehicle.

Fifth, variants of the system can be physically rugged, robust, and/or otherwise resilient to the harsh environment in the vicinity of the wheel due to exposure to road debris and other hazards. The placement of variants of the system at the wheel hub area provides a well-suited area for physically shielding system components between the wheel hub and an outer surface of the system housing 110.

However, the system and/or method can confer any other suitable benefits and/or advantages.

3. System

Figure 2:
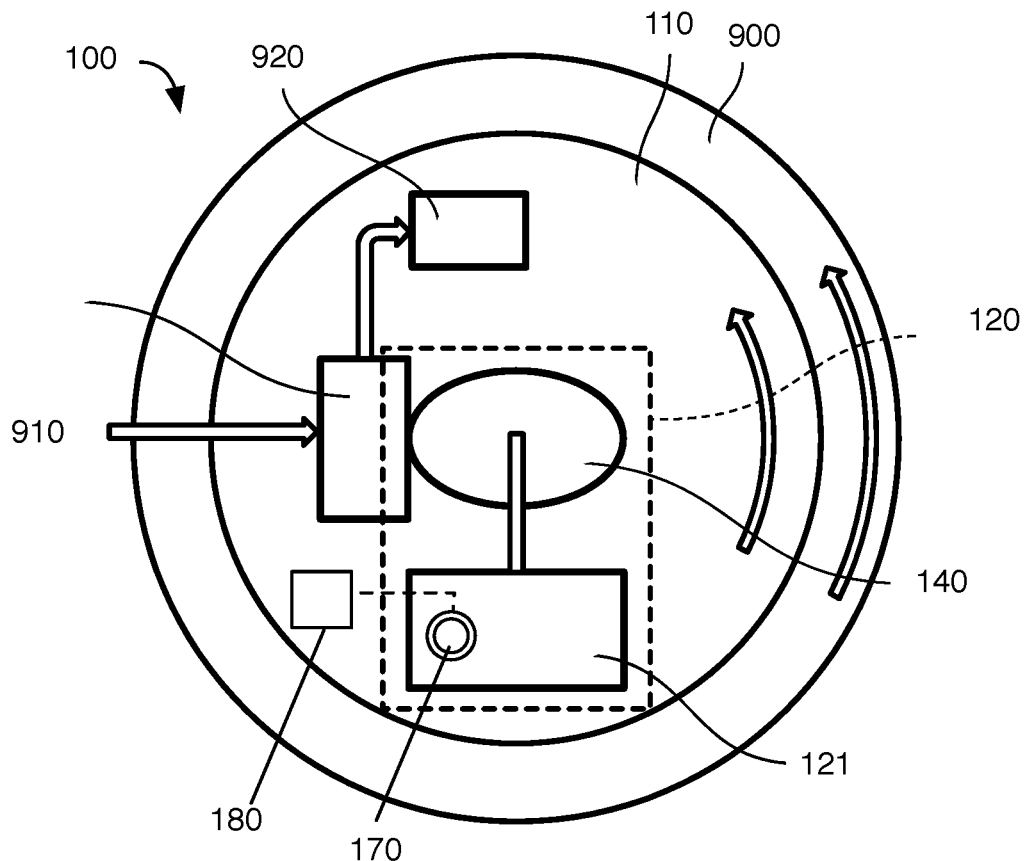
FIG. 2 is a schematic representation of a variation of the tire inflation system.

As shown in FIG. 2, the tire inflation system 100 can include: a housing 110; a drive mechanism 120 that includes a cam 122 and an eccentric mass 121; a primary pump 130 that includes a reciprocating element 131, a pump body 132, a return mechanism 133, and one or more inlets 134; a drive coupler 140 that connects the drive mechanism 120 and the primary pump 130; a torque regulation mechanism 150 that includes a rotor and a stator; an energy storage device 160 that includes an energy dissipation mechanism 161; one or more sensors 170; and a controller 180. Variants of the system or components thereof can be similar to the system and/or components described in U.S. application Ser. No. 15/280,737, filed 29 Sep. 2016, incorporated herein in its entirety by this reference.

3.1 Housing

The housing 110 functions to couple system components to a rotating surface 900 (e.g., the hub of a wheel of a vehicle). The housing 110 can also function to mechanically protect (e.g., shield) system components from road debris and other objects that can transiently impact the wheel during vehicle operation. The housing 110 can also function as a mounting substrate for visual indicators of system performance (e.g., for an LED that reports the system status). The housing 110 is preferably removably coupled to a rotating surface 900, such as by way of removable fasteners (e.g., nuts and bolts, screws, brackets, etc.); additionally or alternatively, the housing 110 can be permanently coupled to the rotating surface 900 (e.g., via welding, rivets, permanent fasteners, etc.). The housing 110 is preferably coupled to a rotating surface 900 of the vehicle (e.g., that rotates during vehicle locomotion), and is more preferably coupled to the hub of a vehicle wheel. However, the housing no can additionally or alternatively be statically coupled to the rim of a vehicle wheel, a hubcap, to an axle of the vehicle, or any other suitable rotating or non-rotating surface 900 of the vehicle. The housing no is preferably coupled to the vehicle by way of a set of fasteners (e.g., arranged to mate with an existing bolt pattern of the wheel hub), but can additionally or alternatively be integrated directly into the vehicle (e.g., manufactured as part of the wheel hub or vehicle axel) or otherwise suitably attached to the vehicle by any other suitable mechanism. In a specific example, the housing 110 is contiguous with a hubcap of the wheel, and is fastened to the wheel (e.g., via a set of lugnuts) and functions both as a hubcap and the system housing 110. The housing 110 is preferably rotatably coupled to the drive mechanism 120 (e.g., such that the eccentric mass 121 can rotate relative to the housing 110) and statically coupled to the pump body 132 of the primary pump 130 (e.g., such that the primary pump 130 rotates with the housing 110 as the wheel rotates. Alternatively, the housing 110 can be statically coupled to the drive mechanism 120 and rotatably coupled to the primary pump 130, or have any other suitable coupling to the other system components. The housing 110 is preferably substantially rigid, but can additionally or alternatively be flexible, resilient, or have any other suitable structural characteristics. The housing 110 is preferably substantially impermeable to fluids (e.g., waterproof) and can preferably at least partially shield system components from exposure to external liquids (e.g., water splashed onto the wheel from the road surface), but can additionally or alternatively be permeable.

Figure 6:
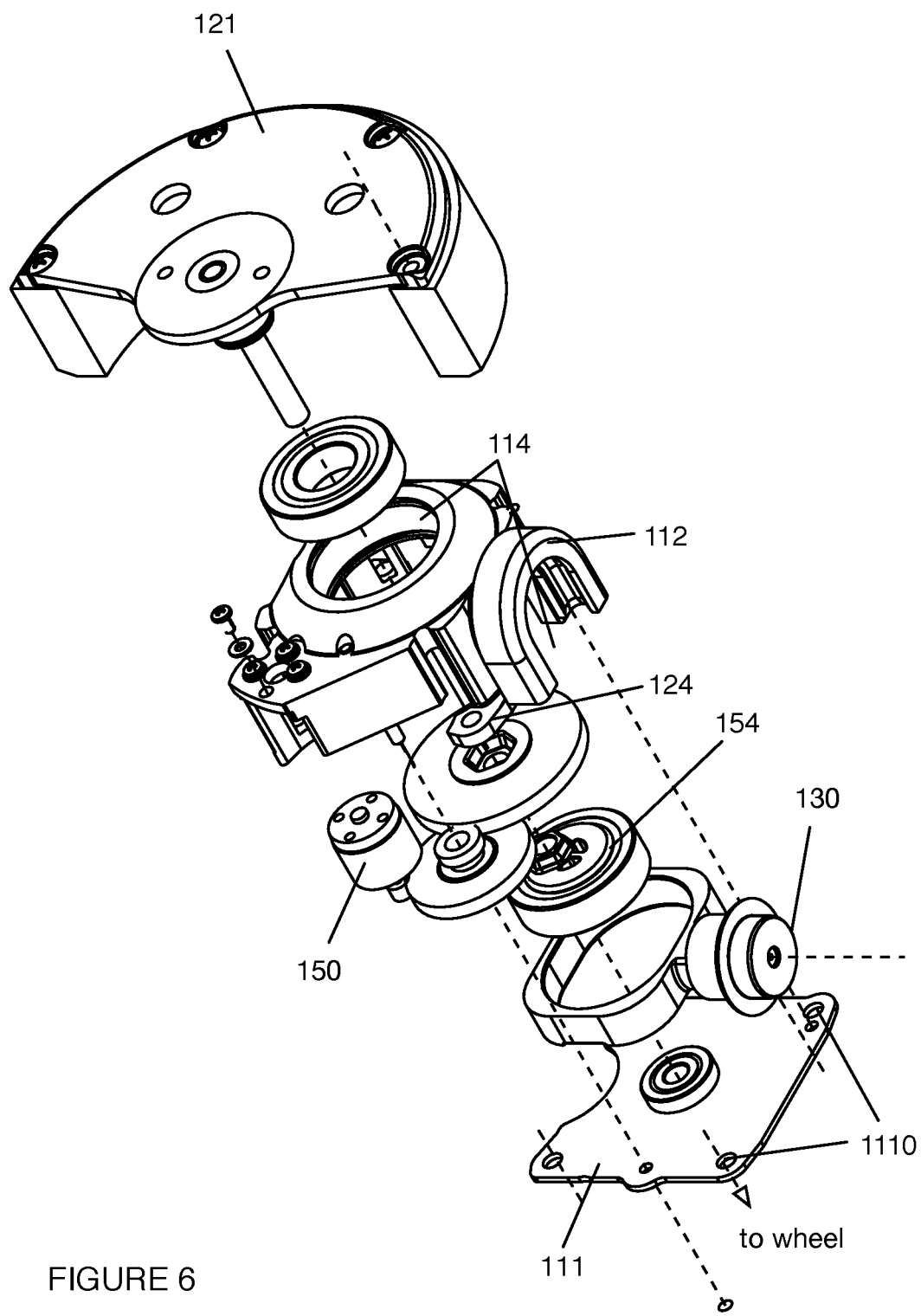
FIG. 6 is an exploded view of a variation of the tire inflation system.

In a first specific example, as shown in FIG. 6, the housing 110 includes an inner housing that includes a first portion 111 (e.g., mounting plate) that defines a hole pattern 1110 arranged to mate with an existing bolt pattern of the wheel, and a second portion 112 that mates with the first portion 111 to cooperatively define a housing lumen 113. The housing lumen 113 contains the primary pump 130, and defines an orifice 114 through which the pump can be connected to a first reservoir 910 of fluid (e.g., ambient air) and a second reservoir of fluid (e.g., the interior of a tire). The housing lumen 113 further contains the torque regulation mechanism 150, which is disposed adjacent to a portion of the drive mechanism 120 such that a torque can be applied by the torque regulation mechanism 150 to the drive mechanism 120 and thereby adjust the angular position of the eccentric mass 121 of the drive mechanism 120 (e.g., to transition the system into the pumping mode or freewheeling mode). In this first specific example, the housing 110 further contains the cam 122, and the eccentric mass 121 is arranged external to the inner housing and coupled to the cam 122 by an axle that extends through the second portion 112. The eccentric mass 121 in this example extends radially past a furthest radial extent of the inner housing, and defines a portion along an arcuate section of the rotational path of the eccentric mass 121 that extends axially toward the first portion 111 of the inner housing. The housing 110 in this example can further include an outer housing that encloses the eccentric mass and the inner housing.

In a second specific example, the housing 110 is integrated directly with a hubcap of a vehicle wheel, and defines a housing lumen 113. The housing lumen 113 contains the primary pump 130, the drive mechanism 120, the torque regulation mechanism 150, and the drive coupler 140, and is substantially sealed against the external environment. The housing 110 defines an inlet, which can include a shielded cover (e.g., to prevent foreign matter besides air from entrance), through which the primary pump 130 draws ambient air for compression and pumping during system operation. In this second specific example, the eccentric mass 121 is arranged internal to the housing 110. The eccentric mass 121 in this example extends radially toward an inner surface of the housing lumen 113, and defines a portion along an arcuate section of the rotational path of the eccentric mass 121.

3.2 Drive Mechanism

The drive mechanism 120 of the tire inflation system 100 functions to generate a pumping force to drive the primary pump 130. The drive mechanism 120 can also function to control the magnitude of the pumping force. The drive mechanism 120 preferably includes an eccentric mass 121 and a cam 122, but can include any other suitable components for generating the pumping force (e.g., a rotary pump, a diaphragm pump, a turbopump, etc.). The pumping force generated by the drive mechanism 120 is preferably applied in a radial direction relative to the rotational axis 123 of the drive mechanism 120 (e.g., the rotational axis 123 of the wheel), but can alternatively be applied in any suitable direction. The pumping force is preferably applied cyclically (e.g., in a reciprocal manner to drive a reciprocating pump), but can additionally or alternatively be a constant force, a steadily increasing or decreasing force, or have any other suitable temporal profile.

The drive mechanism 120 can be rotatably coupled to the housing 110, such that the drive mechanism 120 is substantially stationary in a translating reference frame (e.g., translating with the vehicle) as the housing 110 and wheel rotate. The drive mechanism 120 preferably defines a rotational axis 123 about which a portion of the drive mechanism 120 can rotate, and more preferably the cam 122 of the drive mechanism 120 rotates about the rotational axis 123. However, the rotational axis 123 can additionally or alternatively include the rotational axis 123 about which the eccentric mass 121 rotates, and/or any other suitable axis. The rotational axis 123 of the drive mechanism 120 is preferably coaxial with a rotational axis 123 of the tire inflation system 100 as a whole (e.g., the wheel rotational axis 123), but can alternatively be offset (e.g., radially offset). The drive mechanism 120 preferably defines a single rotational axis 123 (e.g., about which the cam 122 and eccentric mass 121 rotate), but can alternatively define multiple rotational axes (e.g., a first rotational axis 123 about which the eccentric mass 121 rotates, and a second rotational axis 123 distinct from the first rotational axis 123 about which the cam 122 rotates).

Figure 5:
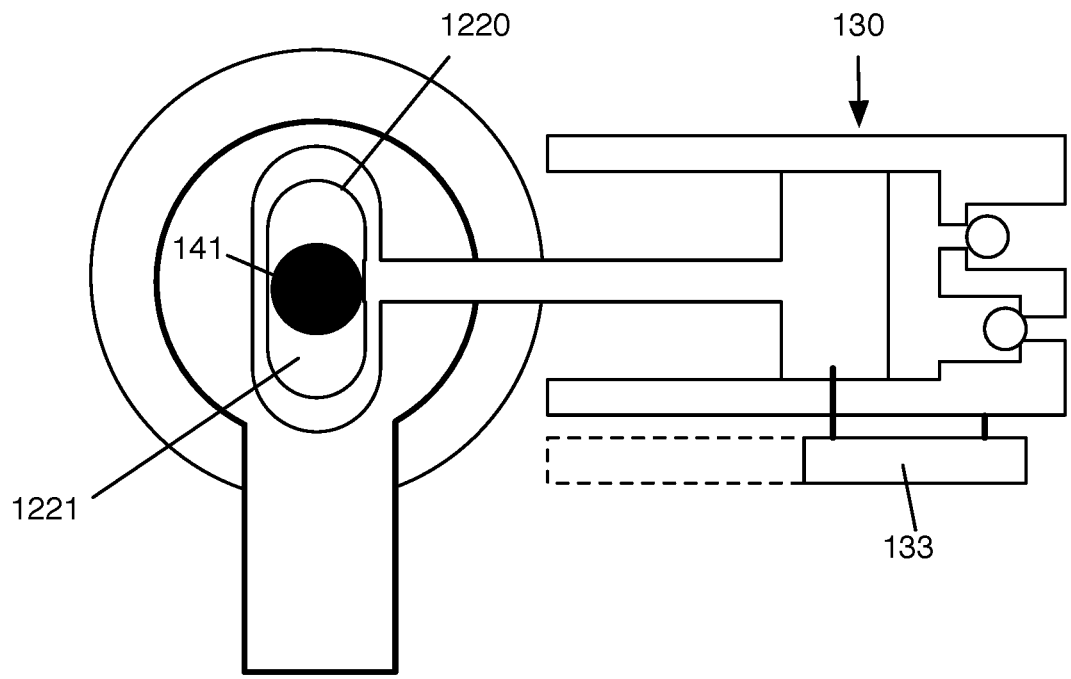
FIG. 5 is a schematic of an example configuration of a slotted cam configuration of the drive coupler of the tire inflation system.

The cam 122 of the drive mechanism 120 functions to mechanically control the magnitude of the pumping force. The cam 122 can also function to convert a torque received from the drive mechanism 120 to a linear force, and apply the linear force against the reciprocating element 131 of the primary pump 130 during the compression stroke. The torque received and/or the linear force applied can be, in variations, constant in time, variable in time, adjustable, or have any other suitable characteristics. In a first variation, the torque provided is modulated in response to a back torque from the reciprocating pump (e.g., assisted by the torque regulation mechanism 150, defined by a feature of the cam 122, etc.). The cam 122 preferably defines a bearing surface 1220, which can be an interior surface of the cam 122, an exterior surface of the cam 122, or any suitable combination of interior and exterior surfaces. The bearing surface 1220 can be continuous or discontinuous. In a specific example, as shown in FIG. 5, the bearing surface 1220 is defined within an interior of the cam 122 and includes a slotted lumen 1221. However, the system can include any suitable cam 122 with any suitable configuration.

The bearing surface 1220 can include a profile that, in variations, defines an arcuate surface, a surface having a non-uniform curvature, a uniform curvature, and/or any other suitable spatial profile. The profile of the bearing surface 1220 preferably controls the magnitude of the pumping force throughout the compression stroke (e.g., a modulated pumping force, a constant pumping force, etc.). The bearing surface 1220 is preferably arcuate, and preferably has a non-uniform curvature (e.g., an oblong profile or a reniform profile). Alternatively, the bearing surface 1220 can have a uniform curvature (e.g., a circular profile), an angular profile, or any other suitable profile. The bearing surface 1220 preferably includes a compression portion and a recovery portion, corresponding to the compression stroke and the recovery stroke of the primary pump 130, respectively. The compression portion is preferably continuous with the recovery section, but can alternatively be discontinuous. The bearing surface 1220 preferably has a first section having a high curvature (preferably positive curvature or convex but alternatively negative curvature or concave) adjacent a second section having low curvature (e.g., substantially flat or having negative curvature compared to the first section). The bearing surface 1220 preferably additionally includes a third section connecting the first and second sections, wherein the third section preferably provides a substantially smooth transition between the first and second sections by having a low curvature adjacent the first section and a high curvature adjacent the second section. The compression portion preferably begins at the end of the second section distal the first section, extends along the third section, and ends at the apex of the first section. The compression portion is preferably convex (e.g., when the bearing surface 1220 is an external bearing surface 1220), but can alternatively be concave. The apex of the first section preferably corresponds to the top of the compression stroke (compressed position). The recovery portion preferably begins at the apex of the first section, extends along the second section, and ends at the end of the second section distal the first section. The recovery portion is preferably substantially flat or concave (e.g., when the bearing surface 1220 is an external bearing surface 1220), but can alternatively be convex. The end of the second section preferably corresponds to the bottom of the recovery stroke (recovered position). The slope of the compression portion is preferably less than 30 degrees, but can alternatively have any suitable angle. When a roller is used as the force translator, the curvature of the bearing surface 1220 is preferably at least three times larger than the roller curvature or roller diameter, but can alternatively be larger or smaller. However, the bearing surface 1220 can have any suitable profile. The cam 122 is preferably substantially planar with the bearing surface 1220 defined along the side of the cam 122, in a plane normal to the rotational axis 123 of the cam 122 (e.g., normal the broad face of the cam 122). The bearing surface 1220 is preferably defined along the entirety of the cam 122 side, but can alternatively be defined along a portion of the cam 122 side. The generated pump force is preferably directed radially outward of the rotational axis 123, more preferably along a plane normal to the rotational axis 123. Alternatively, the cam 122 can have a rounded or otherwise profiled edge segment (transition between the cam 122 broad face and the cam 122 side), wherein the bearing surface 1220 can include the profiled edge. Alternatively, the arcuate surface is defined by a face of the cam 122 parallel to the rotational axis 123 of the cam 122, wherein the generated pump force can be directed at any suitable angle relative to the rotational axis 123, varying from parallel to the rotational axis 123 to normal to the rotational axis 123. The compression portion preferably encompasses the majority of the cam 122 profile, but can alternatively encompass half the cam 122 profile or a small portion of the cam 122 profile. In one variation, the compression portion covers 315 degrees of the cam 122 profile, while the recovery portion covers 45 degrees of the cam 122 profile. However, the compression and recovery portions can cover any other suitable proportion of the cam 122 profile.

Figure 3A:
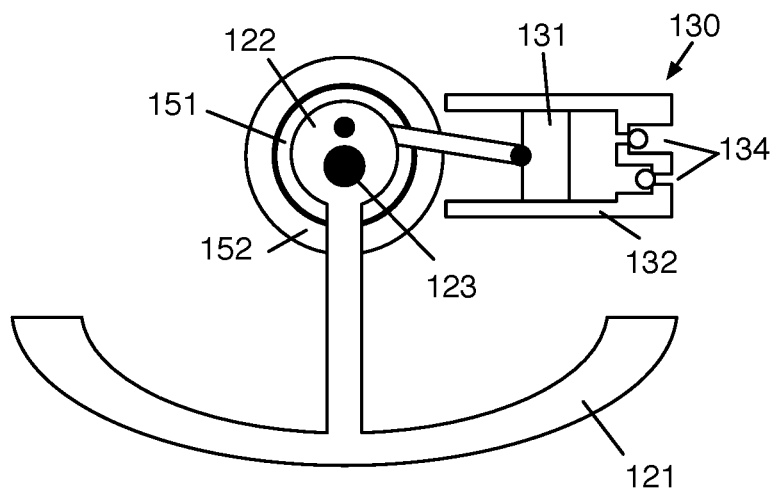
FIGS. 3A-3C are schematic representations of example configurations of the tire inflation system.
Figure 3B:
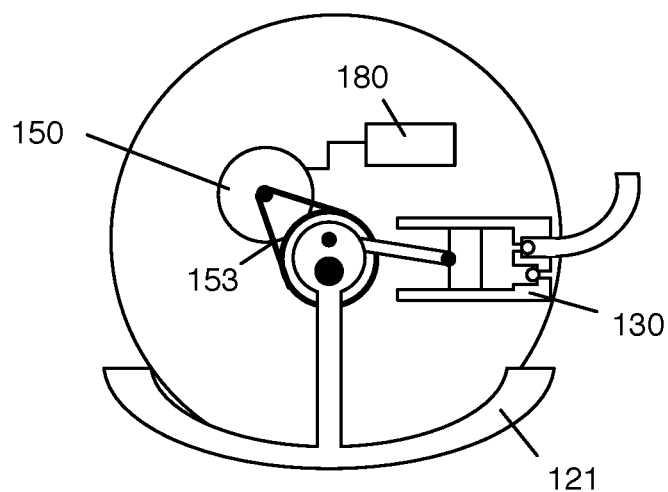

The eccentric mass 121 (e.g., pendulum, offset mass) of the drive mechanism 120 functions to offset the center of mass of the drive mechanism 120 from the rotational axis 123 of the drive mechanism 120. The offset functions to retain an angular position of the drive mechanism 120 relative to a gravity vector, in order to generate relative angular motion between the drive mechanism 120 and components statically coupled to the rotating surface 900 (e.g., the housing 110, the pump body 132, etc.). The eccentric mass 121 is preferably a homogenous (e.g., continuous) mass, but can additionally or alternatively be a heterogeneous (e.g., segmented, discontinuous, etc.) mass. In a specific example, as shown in FIG. 3B, the eccentric mass 121 is rotatably attached to the housing 110 at the rotation axis of the wheel and is distributed along a portion of an arc centered at the rotational axis 123. The eccentric mass 121 is preferably a substantially singular, contiguous piece, but can alternatively be made up of multiple pieces and/or segments. In the latter case, the multiple pieces and/or segments are preferably substantially similar in shape, angular and radial position, and mass, but can alternatively be different in profile, mass, angular position, and/or radial position. The eccentric mass 121 can define a curved shape, flat surface, angular shape, and/or any other suitable geometry. At least a portion of the eccentric mass 121 preferably traces an arcuate section of the system perimeter (e.g., aligned with the hub perimeter, inset from the hub perimeter, outside the housing 110 perimeter, inside the housing 110 perimeter, etc.) such that a substantial fraction (e.g., between 10-90%, between 0-100%) of the mass is distributed along the arcuate section. The arcuate section can include any suitable arc (e.g., 90°, 180°, etc.). However, in alternative variations, the eccentric mass 121 can be a spatially confined mass at an end of a pendulum that approximates a point mass. In some variants, the azimuthal distribution of the mass can be varied. For example, the eccentric mass 121 can include articulated arms that can be unfolded outward (e.g., automatically unfolded, manually unfolded, etc.) to distribute the mass along an arcuate section in the azimuthal direction about the rotational axis 123. However, the eccentric mass 121 can be otherwise suitably configured and/or arranged.

The eccentric mass 121 is preferably curved, but can alternatively be substantially flat, angled, or have other suitable shape. The radius of the eccentric mass 121 curvature is preferably maximized, such that the eccentric mass 121 traces an arcuate section of the pump system perimeter. However, the eccentric mass 121 can have any other suitable curvature. The eccentric mass 121 preferably extends at least 90 degrees about the rotational axis 123 of the drive mechanism 120, more preferably 180 degrees about the rotational axis 123, but can extend more or less than 180 degrees about the rotational axis 123. The eccentric mass 121 preferably has substantially more mass than the cam 122, but can alternatively have a substantially similar mass or a smaller mass. The eccentric mass 121 preferably imparts 2 in-lb (0.225 Nm) of torque on the cam 122, but can alternatively impart more or less torque.

The eccentric mass 121 is preferably a separate piece from the cam 122, and is preferably coupled to the cam 122 by a mass coupler 124. Alternatively, the eccentric mass 121 can be incorporated into the cam 122, wherein the eccentric mass 121 is incorporated along the perimeter of the cam 122, incorporated into a half of the cam 122, or incorporated along any other suitable portion of the cam 122. The eccentric mass 121 can be statically coupled to the cam 122 or rotatably coupled to the cam 122. In the variation wherein the eccentric mass 121 is statically coupled to the cam 122, the eccentric mass 121 can be coupled to the cam 122 at the rotational axis 123 of the cam 122, at the rotational axis 123 of the drive mechanism 120, offset from the rotational axis 123 of the cam 122, or at any other suitable portion of the cam 122. The eccentric mass 121 can be permanently connected to the cam 122. Alternatively, the eccentric mass 121 can be transiently connected (removably coupled) to the cam 122, wherein the eccentric mass 121 can be operable between a pumping mode wherein the eccentric mass 121 is coupled to the cam 122 and a non-pumping mode wherein the eccentric mass 121 is disconnected from the cam 122. The mass coupler 124 preferably has a high moment of inertia, but can alternatively have a low moment of inertia. The mass coupler 124 is preferably a disk, but can alternatively be a lever arm, plate, axle, or any other suitable connection. The mass coupler 124 preferably couples to the broad face of the cam 122, but can alternatively couple to the edge of the cam 122, along the exterior bearing surface 1220 of the cam 122, to the interior bearing surface 1220 of the cam 122, to an axle extending from of the cam 122 (wherein the cam 122 can be statically fixed to or rotatably mounted to the axle), or to any other suitable portion of the cam 122. The mass coupler 124 can couple to the cam 122 by friction, by a transient coupling mechanism (e.g., complimentary electric or permanent magnets located on the cam 122 and mass coupler 124, a piston, a pin and groove mechanism, etc.), by bearings, or by any other suitable coupling means. When the mass coupler 124 couples to the cam 122 by a transient coupling mechanism, the mass coupler 124 is preferably operable between a coupled mode, wherein the mass coupler 124 connects the eccentric mass 121 to the cam 122, and a decoupled mode, wherein the mass coupler 124 disconnects the eccentric mass 121 from the cam 122. The mass coupler 124 can additionally function as a shutoff mechanism, wherein the mass coupler 124 is switched from the coupled mode to the decoupled mode in response to the detection of a shutoff event (e.g., the reservoir pressure reaching a threshold pressure). In one variation, the mass coupler 124 is a disk located within the lumen defined by an interior bearing surface 1220 of the cam 122, wherein the disk can rotate relative to the interior bearing surface 1220 in the decoupled mode and is coupled to the interior bearing surface 1220 by a friction element in the coupled mode (e.g., the mass coupler 124 acts as a clutch). In another variation, the mass coupler 124 is rotatably mounted on an axle extending from the cam 122 by bearings, wherein the mass coupler 124 can be statically coupled to the cam 122 by one or more sets of magnets or pistons extending from the adjacent broad faces of the cam 122 and mass coupler 124.

3.3 Primary Pump

The primary pump 130 of the tire inflation system 100 functions to pressurize fluid with the pumping force generated by the drive mechanism 120. The primary pump 130 preferably includes a reciprocating element 131 and a pump body 132, and can optionally include a return mechanism 133 and one or more inlets 134. However, the primary pump 130 can include any other suitable components. In variations, the primary pump 130 can function to pressurize the fluid by receiving a reciprocating linear force at the reciprocating element 131. The primary pump 130 is preferably statically mounted to the housing 110, wherein the housing 110 is statically coupled to a rotating surface 900 of the vehicle (e.g., the hub of a wheel). However, the primary pump 130 can additionally or alternatively be statically coupled to a surface that rotates relative to the rotating surface 900 (e.g., that is stationary in an external translating reference frame), such that relative motion is generated between the reciprocating element 131 of the primary pump 130 and the rotating surface 900. The primary pump 130 is preferably positioned radially distal the rotational axis of the drive mechanism 120, but can additionally or alternatively be positioned at least partially coaxially with the rotational axis of the drive mechanism 120 or otherwise suitably arranged. The position of the primary pump 130 relative to the drive mechanism 120 can be fixed or adjustable (e.g., manually adjustable, automatically adjustable, etc.).

In a first variation, the primary pump 130 includes a positive displacement pump wherein the reciprocating element 131 is a piston, and defines a pump cavity (e.g., pump lumen, cylinder) within the pump body 132. In a specific example of this variation, the primary pump 130 is a reciprocating piston pump. In a second variation, the primary pump 130 includes a peristaltic pump. However, the primary pump 130 can include any other suitable pumping mechanism.

The reciprocating element 131 of the primary pump 130 functions to translate back and forth in a reciprocating manner within the pump body 132 to compress fluid transferred from the first reservoir 910 to the second reservoir (e.g., to the tire). The reciprocating element 131 can also function to receive the pumping force from the cam 122 and translate within the lumen of the pump, actuating relative to the pump body 132. This actuation preferably creates a variable pressure within the lumen. The reciprocating element 131 is preferably operable between a compressed position and a recovered position. In the compressed position, a portion of the reciprocating element 131 (e.g., the center) is preferably proximal the pump body 132 bottom. In the recovered position, the portion of the reciprocating element 131 is preferably distal the pump body 132 bottom, and is preferably proximal the pump body 132 opening. The reciprocating element 131 preferably travels along a compression stroke to transition from the recovered position to the compressed position, and travels along a recovery stroke to transition from the compressed position to the recovered position. The reciprocating element 131 can additionally be positioned at a pressurized position, wherein the reciprocating element 131 is located at a second position distal the pump body 132 bottom, wherein the second position is further from the pump body 132 bottom than the recovered position. The reciprocating element 131 is preferably at the pressurized position when the force provided by the lumen pressure exceeds the force provided by the cam 122 on the reciprocating element 131.

The reciprocating element 131 preferably translates along an actuation axis within the primary pump 130 throughout the compression stroke, and can additionally translate along the actuation axis throughout the recovery stroke. The reciprocating element 131 preferably includes an actuating area that provides the pressurization force. The actuating area is preferably the surface area of a broad face of the reciprocating element 131, more preferably the surface area of the broad face proximal the lumen but alternatively any other suitable broad face. Alternatively, the actuating area can be the surface area of a section of the reciprocating element 131 that translates between the compressed position and the recovered position (e.g., the center portion).

The reciprocating element 131 preferably forms a fluid impermeable seal with the pump body 132, more preferably with the walls defining the pump body 132 opening, such that the reciprocating element 131 substantially seals the pump body 132 opening. The reciprocating element 131 can be sealed to the pump body 132 by a retention mechanism. The retention mechanism is preferably a clamp that applies a compressive force against the reciprocating element 131 edge and the pump body 132 wall, but can alternatively be screws or bolts through the reciprocating element 131 edge, adhesive between the reciprocating element 131 and the pump body 132 wall or over the reciprocating element 131 and the pump body 132 wall, or any other suitable retention mechanism. The reciprocating element 131 can also be sealed against the pump body 132 wall by melting the interface between the reciprocating element 131 and pump body 132 wall, or by any other suitable means of sealing the reciprocating element 131 against the pump body 132 wall.

The reciprocating element 131 is preferably a flexible diaphragm, but can alternatively be a substantially rigid piston, a piston coupled to the diaphragm, or any other suitable element that actuates in response to the pumping force. The diaphragm is preferably a rolling diaphragm (e.g., with a rolled perimeter, wherein the diaphragm is preferably coupled to the pump body 132 with the extra material distal the lumen) but can also be a flat diaphragm, a domed diaphragm (preferably coupled to the pump body 132 with the apex distal the lumen, but alternatively coupled to the pump body 132 with the apex proximal the lumen), or any other suitable diaphragm.

The pump body 132 functions to cooperatively compress fluid along with the reciprocating element 131. The pump body 132 defines a lumen (e.g., cylinder cavity) in which the fluid is compressed. The pump body 132 is preferably statically mounted to the housing 110, but can be otherwise suitable arranged relative to the housing 110 and/or other system components.

The primary pump 130 can include a return mechanism 133, which functions to bias the reciprocating element 131 in the reverse direction to the direction of the compression stroke during the recovery stroke. The return mechanism 133 preferably provides a recovery force that is less than the compression force provided by the third section of the cam 122, but larger than the force applied by the cam 122 in the second section. The recovery force is preferably provided in a direction substantially parallel to a radial vector extending from the rotational axis of the drive mechanism 120, but can alternatively be provided in any suitable direction. The return mechanism 133 is preferably located on the pump body 132 side of the reciprocating element 131 (distal the cam 122 across the reciprocating element 131), wherein the return mechanism 133 preferably pushes the reciprocating element 131 from the compressed position, through the recovery stroke, and to the recovered position. Alternatively, the return mechanism 133 can be located on the cam 122 side of the reciprocating element 131 (distal the pump body 132 across the reciprocating element 131), wherein the return mechanism 133 pulls the reciprocating element 131 back to the recovered position from the compressed position. The return mechanism 133 is preferably coupled to the perimeter of the reciprocating element 131 or to a component (e.g., a brace) coupled to the reciprocating element 131 and extending past the pump body 132 walls, but can alternatively be coupled to the body of the reciprocating element 131 (e.g., to the section actuating between the compressed position 222 and the recovered position). The return mechanism 133 is preferably coupled to the reciprocating element 131 external the pump body 132, but can alternatively be coupled to the reciprocating element 131 within the pump body 132 240. The return mechanism 133 is preferably a spring, but can also include the intrinsic properties of the actuation element (e.g., the elasticity of the diaphragm) or any other suitable return mechanism 133.

The return mechanism 133 can, in further variations, include an internal spring, an exterior spring (e.g., mounted to an outer surface of the pump body 132), a secondary cam 122 that drives the reciprocating element 131 in opposition to the cam 122 of the drive mechanism 120, and/or any other suitable mechanism.

The primary pump 130 can include one or more inlets 134, which function to receive fluid from the first reservoir 910 into the lumen of the pump body 132 for compression. The inlets 134 can be perpetually open (e.g., fixed orifice 114s in the pump body 132), actuatable (e.g., via controllable valves), shielded (e.g., to protect against influx of foreign matter besides the working fluid), or otherwise suitably constituted.

3.4 Drive Coupler

The drive coupler 140 of the tire inflation system 100 functions to actuate the reciprocating element 131 of the primary pump 130 through the compression stroke as the primary pump 130 rotates about the rotational axis of the wheel. The drive coupler 140 can also function to translate the reciprocating element 131 through the recovery stroke. The drive coupler 140 is preferably coupled between the cam 122 of the drive mechanism 120 and the reciprocating element 131 of the primary pump 130, but can alternatively be otherwise suitably coupled. In a first variation, the drive coupler 140 is coupled to the cam 122 by way of a roller bearing 141 captive within an oblong slot defined by the cam 122, and pinned to the reciprocating element 131 (e.g., rotatable about a fixed point). In a second variation, the drive coupler 140 is pinned to both the cam 122 and the reciprocating element 131. The drive coupler 140 preferably defines an axis having an arcuate position that is fixed relative to the arcuate position the primary pump 130 (e.g., the angular position of the drive coupler 140 about the rotational axis of the wheel is fixed relative to the angular position of the primary pump 130). Preferably, the drive coupler 140 rotates with the primary pump 130 as both components rotate about the rotational axis of the wheel. However, the drive coupler 140 can additionally or alternatively exhibit a different relative rotation to the primary pump 130 (e.g., a different angular velocity, a different trajectory, an off-axis trajectory, etc.).

3.5 Torque Regulation Mechanism

The torque regulation mechanism 150 functions to regulate the torque supplied to the drive mechanism 120 in order to transition the tire inflation system 100 between the pumping and freewheeling operation modes. The torque regulation mechanism 150 can also function to receive torque from the drive mechanism 120 and convert the received torque into electrical potential energy (e.g., to operate as a dynamo). The torque regulation mechanism 150 can also function to provide a torque (e.g., based on instructions from the controller 180) to transition the tire inflation system 100 between the pumping mode and the freewheeling mode, and/or to maintain the tire inflation system 100 in one or more of the pumping mode, the freewheeling mode, and any other suitable operating modes. The torque regulation mechanism is preferably configured to apply a torque based on instructions received from a controller. The instructions can be automatically generated by the controller, generated by a system user in communication with the controller (e.g., manually via an electromechanical interface, wirelessly via a wireless transceiver, etc.), or otherwise suitably generated.

The torque regulation mechanism 150 preferably includes a first portion 151 and second portion 152 that rotate relative to one another, but can be otherwise configured. In one variation, the first portion 151 includes a stator that is statically coupled to a rotating surface 900 (e.g., the housing 110 statically coupled to the wheel) and the second portion 152 includes a rotor that is statically coupled to the eccentric mass 121 such that the rotor rotates along with the eccentric mass 121. In another variation, the stator is statically coupled to the eccentric mass 121 and the rotor is coupled to the rotating surface 900 by way of the housing 110. The rotor and stator are preferably concentrically arranged, but can alternatively be offset (e.g., and mechanically linked by a force transfer mechanism 153). However, the first and second portion 152s of the torque regulation mechanism 150s can be otherwise suitably relatively arranged. In a specific example, the torque regulation mechanism 150 is coupled to the eccentric mass 121 via an intermediate force transfer mechanism 153 (e.g., a gear, a gearbox, a belt, a chain, a clutch, etc.). The torque regulation mechanism 150 is preferably electrically coupled to the controller 180 (e.g., to receive control instructions and/or signals) and the energy storage device 160 by way of one or more direct electrical power and/or data connections. However, the torque regulation mechanism 150 can be otherwise suitably coupled to the controller 180 and/or energy storage device 160.

Figure 3C:
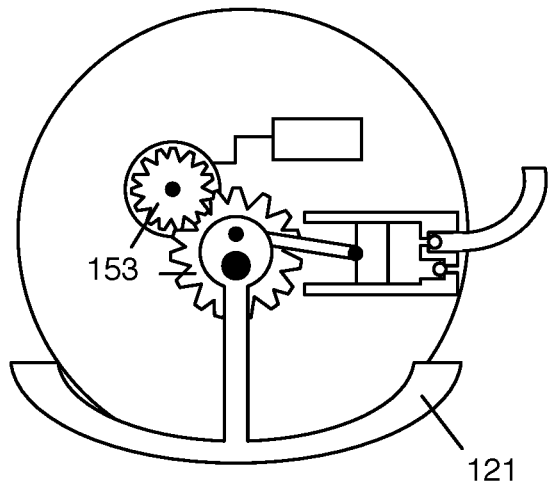
Figures 4A, 4B:
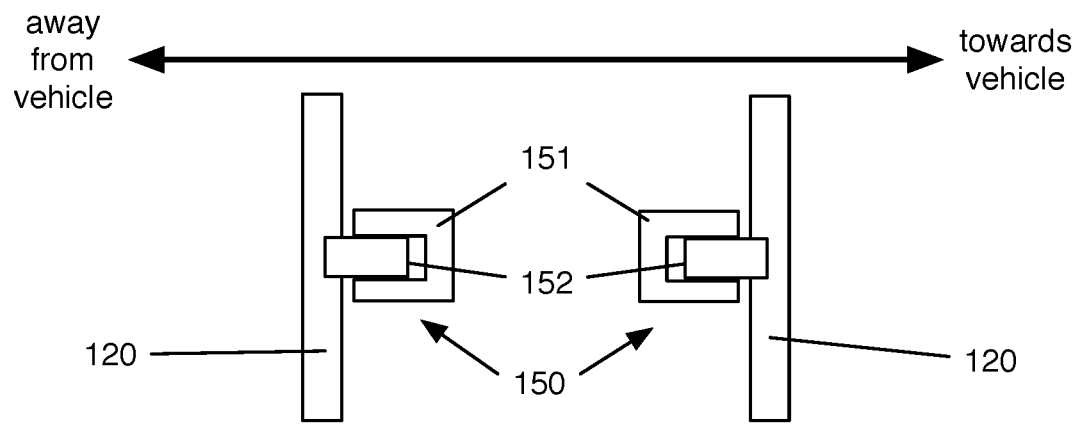
FIGS. 4A-4B are top views of example relative configurations of the drive mechanism and the torque regulation mechanism.

The torque regulation mechanism 150 is preferably arranged at a different plane from the rotation plane of the eccentric mass 121 (e.g., distal the rotation plane of the eccentric mass 121 in a direction away from the wheel hub, distal the rotation plane of the eccentric mass 121 in a direction toward the wheel hub, etc.). As shown in FIG. 4A, the torque regulation mechanism 150 can be arranged toward the vehicle (e.g., toward the vehicle centerline) relative to the drive mechanism 120 (e.g., the eccentric mass 121 of the drive mechanism 120). As shown in FIG. 4B, the torque regulation mechanism 150 can be arranged away from the vehicle relative to the drive mechanism 120. However, the torque regulation mechanism 150 can additionally or alternatively be arranged in the same plane (e.g., coaxially arranged, offset from the rotation axis of the eccentric mass 121, etc.). In a first variation, as shown in FIG. 3A, the torque regulation mechanism 150 is arranged coaxially with the rotation axis of the wheel and the eccentric mass 121. In further variations, as shown in FIGS. 3B and 3C, the torque regulation mechanism 150 is arranged at an offset position from the rotation axis of the eccentric mass 121, and connected to the eccentric mass 121 via a force transfer mechanism 153 (e.g., a chain and sprocket, a drive belt, etc.). However, the torque regulation mechanism 150 can be otherwise arranged relative to the drive mechanism 120, axis of rotation, or eccentric mass 121. The torque regulation mechanism 153 can apply a: radially inward force, radially outward force, linearly outward force (e.g., away from the wheel or longitudinal vehicle axis), linearly inward force (e.g., toward the vehicle), arcuate force (e.g., within the same plane as eccentric mass rotation), or any other suitable force to the eccentric mass, cam, pump, or other pumping component. The torque regulation mechanism can be statically mounted to: the housing (e.g., interior, exterior, component proximal the tire, component distal the tire, an arcuate segment of the sidewall, etc.), the eccentric mass, the cam, the pump, or to any suitable system component.

The torque regulation mechanism 150 preferably includes an electric motor, but can additionally or alternatively include any suitable torque generation and/or regulation mechanism. The electric motor can be an outrunner motor, an inrunner motor, a brushed motor, a brushless motor, an alternating-current motor, a directocurrent motor, a permanent magnet motor, an induction motor, a servo motor, a stepper motor, and/or any other suitable motor. The electric motor preferably generates a rotational force, but can alternatively generate a linear force (e.g., be a linear actuator) or generate any suitable force. In variations, the torque regulation mechanism 150 can include mechanical torque regulation components, such as gears, springs, levers, and any other suitable clockwork components that do not require electrical energy for operation.

The rotor of the torque regulation mechanism 150 functions to move relative to the stator under an applied electromotive force to generate a torque on components statically coupled to the rotor. The rotor can also function to move relative to the stator under an applied torque to generate an electromotive force that can be harvested and stored as electrical potential energy (e.g., at the energy storage device 160). In a first variation, the rotor is statically coupled to a surface that rotates with the wheel. In a second variation, the rotor is statically coupled to a surface that is substantially stationary relative to the wheel. However, the rotor can be otherwise suitably coupled.

The stator of the torque regulation mechanism 150 functions to move relative to the rotor under an applied electromotive force to generate a torque on components statically coupled to the stator. The stator can also function to move relative to the rotor under an applied torque to generate an electromotive force that can be harvested and stored as electrical potential energy (e.g., at the energy storage device 160). In a first variation, the stator is statically coupled to a surface that is substantially stationary relative to the wheel. In a second variation, the stator is statically coupled to a surface that rotates with the wheel. However, the stator can be otherwise suitably coupled.

The torque regulation mechanism 150 can include an engagement mechanism 154 that functions to mechanically engage and/or disengage the eccentric mass 121 from other system components. For example, the engagement mechanism 154 can include a clutch that mechanically engages the eccentric mass 121 and the drive coupler 140 during system operation in the pumping mode (e.g., such that a drive force is provided by the eccentric mass 121 when the eccentric mass 121 is maintained at a non-zero hanging angle), and that mechanically disengages the eccentric mass 121 and the drive coupler 140 during system operation in the freewheeling mode (e.g., such that no drive force is provided by the eccentric mass 121 irrespective of the angular position and/or velocity of the eccentric mass 121). In some variations, the mass coupler 124 can function as an engagement mechanism 154. However, the engagement mechanism 154 can include any other suitable mechanism for mechanically retaining the eccentric mass 121 relative to the pump and/or other rotating components of the system.

In a first specific example, as shown in FIG. 6, the torque regulation mechanism 150 includes an electric motor wherein the stator of the electric motor is rigidly attached to the eccentric mass 121 (e.g., an arcuate segment of the stator defines a portion of the eccentric mass 121), the rotor of the electric motor is rigidly coupled to a rotating surface 900 (e.g., the housing 110, the wheel hub, via mounting components, directly coupled via a weld, etc.), and the rotor is connected to the drive coupler 140 that drives the primary pump 130. In a second specific example, the torque regulation mechanism 150 includes an electric motor wherein the stator is rigidly mounted to the housing 110, and is offset from the tire inflation system 100's rotational axis and is connected to the eccentric mass 121 by a force linkage (e.g., a gearbox).

3.6 Energy Storage Device

The tire inflation system 100 can include an energy storage device 160, which functions to provide power to the torque regulation mechanism 150. The energy storage device 160 can also function to receive power from the torque regulation mechanism 150 (e.g., when the torque regulation mechanism 150 is operating as a dynamo). The energy storage device 160 can, in some variations, function to store compressed fluid generated by the primary pump 130 (e.g., in a compressed air canister). The energy storage device 160 is preferably coupled to the torque regulation mechanism 150 (e.g., via a direct electrical connection for power provision and/or reception), but can additionally or alternatively be coupled to the controller 180, primary pump 130, and/or any other system components. The system preferably includes a single energy storage device 160, but can additionally or alternatively include redundant (e.g., multiple) energy storage device 160s (e.g., to provide backup power to system components such as the torque regulation mechanism 150). The energy storage device 160 is preferably coupled to the housing 110 and rotates with the wheel, but can alternatively be coupled to the eccentric mass 121 or to any other suitable system component. The energy storage device 160 is preferably arranged axially inward (e.g., along the direction of the vehicle axle) from the eccentric mass 121, but can alternatively be arranged axially outward from the eccentric mass 121. In a first variation, the energy storage device 160 includes a battery. In further variations, the energy storage device 160 can include a super capacitor, a compressed air canister, one or more springs, and/or any other suitable energy storage mechanisms.

The energy storage device 160 can optionally include an energy dissipation mechanism 161 that functions to dissipate excess energy generated by the torque regulation mechanism 150 (e.g., when the torque regulation mechanism 150 is operating as a dynamo) in cases wherein the energy storage device 160 is at full capacity (e.g., when the battery is fully charged). For example, the energy dissipation mechanism 161 can include an electrical resistor, a resistor network, and/or any other suitable passive component for dissipating electrical energy in variations wherein the energy storage device 160 includes an electrical energy storage device 160 (e.g., a battery, capacitor, supercapacitor, etc.). In another example, the energy dissipation mechanism 161 can include an active energy dissipation mechanism 161, such as a fan, water pump, light emitting element, and/or any other suitable powered mechanism, to utilize excess recovered energy stored at the energy storage device 160 (e.g., for the purpose of cooling, user notification generation, etc.).

3.7 Sensors

The tire inflation system 100 can include one or more sensors 170, which function to sense operational parameters of the system (e.g., tire pressure, whether the system is in an "on" state or an "off" state, whether the system is operating within nominal ranges, etc.). The sensors 170 can also function to provide sensor data to a controller 180. The sensors 170 can also function to detect, in cooperation with the controller 180, whether the system is operating in the freewheeling and/or pumping modes (e.g., by comparing a measured rotational velocity of the eccentric mass 121 with a measured rotational velocity of the wheel). The system can include one or more pressure sensors 170, which can be connected to the output of the primary pump 130 to monitor the pressure of the fluid provided to the tire. The sensor(s) are preferably connected to the controller 180 (e.g., via a signal pathway) to provide sensor data (e.g., sensor signals) to the controller 180, and mounted on and/or within the housing 110 (e.g., for mechanical support). However, the sensor(s) can be otherwise suitably connected. System sensors 170 can include pressure sensors 170 (e.g., capacitively-based diaphragm deflection gauges), flow rate sensors 170, mass flow sensors 170 (e.g., inline impellers), orientation sensors 170 (e.g., accelerometers, inertial measurement units, gyroscopes, etc.), rotary encoders, and/or any other suitable type of sensor.

In a first variation, the system includes a pressure sensor arranged at an interface between the output of the primary pump 130 and the inlet of the second reservoir (e.g., the tire) to continuously measure the static pressure of the second reservoir. In a second specific example, the system includes a rotary encoder coupled to the torque regulation mechanism 150 that periodically measures (e.g., at 1 kHz) the angular position of the rotor of the torque regulation mechanism 150.

In a second variation, the system includes a sensor (e.g., an angular position sensor, angular velocity sensor, etc.) communicatively coupled to the controller 180, that detects and outputs the relative angular velocity between the eccentric mass 121 and the primary pump 130, wherein the controller 180 generates instructions based on an output of the differential angular velocity sensor and controls the torque regulation mechanism 150 based on the instructions. The sensor can be arranged to be in contact with the eccentric mass 121 (e.g., a contact sensor) and output the angular position and/or velocity based a characteristic of the contact; for example, the electrical resistance through a portion of the sensor can increase or decrease based on the position at which the sensor contacts the eccentric mass 121. The sensor can additionally or alternatively be physically separated from the eccentric mass 121; for example, the sensor can include an optical sensor that counts the frequency of optical occlusions of the optical sensor by the eccentric mass 121 during rotation of the eccentric mass 121 and/or the wheel, from which the angular velocity of the eccentric mass 121 can be computed (e.g., by the controller 180). However, the system can include any other suitable sensors 170.

3.8 Controller

The tire inflation system 100 can include a controller 180, which functions to generate control in puts in response to received sensor data and/or instructions. The controller 180 can also function to control the torque regulation mechanism 150 to operate the system between operating modes (e.g., the pumping mode, the freewheeling mode, etc.). The controller 180 can also function to adjust the pressure set point of the tire inflation system 100 and to control the tire inflation system 100 to maintain the tire pressure at the pressure set point. The controller 180 can also function to generate messages in response to system behavior (e.g., error codes). The controller 180 can be communicatively coupled to the sensors 170 and torque regulation mechanism 150 of the system, and in some variations can be communicatively coupled to a remote computing system (e.g., a vehicle ECU, a mobile device within the vehicle, etc.) via a communication system (e.g., wired communications system; wireless communications system, such as Bluetooth, WiFi, Zigbee, cellular, etc.).

In a first specific example of controller 180 operation, the controller 180 detects a perturbative torque to the eccentric mass 121 (e.g., from an angular position sensor of the eccentric mass 121) and controls the torque regulation mechanism 150 (e.g., an electric motor) to dampen the perturbative torque and maintain the system in the pumping mode (e.g., maintain a non-zero angle between a gravity vector and the eccentric mass 121) and prevent the perturbative torque from transitioning the system from the pumping mode into the freewheeling mode. The perturbative torque can be detected via heuristic comparisons (e.g., pattern matching), deterministic comparisons (e.g., an oscillation exceeding a threshold perturbation magnitude), and/or in any other suitable manner. The perturbative torque can be a back torque generated by the primary pump 130 (e.g., due to reciprocating pump dynamics), a disturbance originating from road roughness, external forces and/or shocks, or any other source of torque or force.

In a second specific example of controller 180 operation, the controller 180 receives an instruction (e.g., from a vehicle control system, a user, etc.) to cease pumping (e.g., to transition the system into the freewheeling operating mode from the pumping mode), and in response controls the torque regulation mechanism 150 to apply a torque to the eccentric mass 121 to induce rotation of the eccentric mass 121 at substantially the same angular velocity of the rotating wheel.

3.9 System Examples

In a first specific example of the tire inflation system 100, the system includes a drive mechanism 120, a pump, a drive coupler 140, a torque regulation mechanism 150, and a controller 180. The drive mechanism 120 defines a rotational axis, and includes a cam 122 rotatable about the rotational axis and an eccentric mass 121 coupled thereto that offsets a center of mass of the drive mechanism 120 from the rotational axis along the radial vector. The pump is arranged radially distal the rotational axis of the drive mechanism 120, and includes a chamber defining a chamber lumen, and a reciprocating element 131 arranged at least partially within the chamber lumen and translateable along a pump axis normal to the rotational axis. The drive coupler 140 is coupled between the cam 122 at a first position and the reciprocating element 131 at a second position. The first position is radially distal the rotational axis about which the cam 122 rotates, and the second position is fixed (e.g., pinned) to the reciprocating element 131. The torque regulation mechanism 150 (e.g., an electric motor, a clockwork mechanism, etc.) includes a first portion rigidly coupled to the eccentric mass 121, and a second portion rotatably coupled to the first portion. The controller 180 is communicatively coupled to the torque regulation mechanism 150 (e.g., by a hardwire data connection, serial data port, etc.), and to a sensor (e.g., an angular velocity sensor, an angular position sensor, a rotary encoder, etc.) that senses an angular characteristic (e.g., angular position, angular velocity, etc.) of the eccentric mass 121 relative to a gravity vector. The controller 180 is configured to operate the system between the pumping mode and the freewheeling mode. In the pumping mode, the torque regulation mechanism 150 maintains the eccentric mass 121 at a hanging angle (e.g., defined by the radial vector between the rotational axis and an end of the eccentric mass 121 opposing the point at which the eccentric mass 121 is connected to the rotational axis) greater than 0° relative to the gravity vector. In cases where the system is in the freewheeling mode prior to transitioning to the pumping mode, the torque regulation mechanism 150 applies a torque to the eccentric mass 121 to stimulate the eccentric mass 121 to exit a spin condition (e.g., wherein the eccentric mass 121 is rotating about the rotational axis at substantially the same angular velocity as the wheel to which the system is attached).

In a related specific example, the system further includes an energy storage device 160 (e.g., a battery, a torsional spring, a pneumatic cylinder, etc.) communicatively coupled (e.g., via a direct electrical connection, a direct mechanical connection, a fluid connection, etc.) to the torque regulation mechanism 150 and the controller 180. The energy storage device 160 is operably between a harvesting mode and a powering mode. In the harvesting mode, the energy storage device 160 receives and stores energy harvested from the torque regulation mechanism 150, which in turn receives a torque input from the eccentric mass 121. For example, in a case where the eccentric mass 121 is decoupled from the cam 122 and/or primary pump 130 (e.g., such that zero drive force is provided to the reciprocating element 131), the eccentric mass 121 can be maintained at a non-zero hanging angle relative to a gravity vector in order to harvest energy (e.g., gravitational energy) to store within the energy storage device 160. In the powering mode, the energy storage device 160 provides energy to the torque regulation mechanism 150, which in turn provides a torque input to the eccentric mass 121. The system and the energy storage device 160 of this example is preferably operated between the harvesting and powering mode by way of the controller 180, but can be additionally or alternatively operated by any suitable mechanism or control instructions.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller 180 430. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In a second specific example, the tire inflation system 100 includes a drive mechanism 120, a drive coupler 140, a reciprocating pump, a torque regulation mechanism 150, a housing 110, and a controller 180. The drive mechanism 120 defines a rotational axis, and includes a cam 122 rotatable about the rotational axis and an eccentric mass 121 coupled to the cam 122 that offsets a center of mass of the drive mechanism 120 from the rotational axis along a radial vector and is rotatable about the rotational axis. The cam 122 includes a slotted lumen that defines an interior surface. The drive coupler 140 defines a first and second end, and the first end of the drive coupler 140 is coupled to the cam 122 at a position radially distal the rotational axis. The first end further includes a roller bearing, and at the coupling position to the cam 122 the roller bearing is captivated within the slotted lumen and contacts the cam 122 at the interior surface. The second end is coupled to the reciprocating pump. The reciprocating pump is arranged radially distal the rotational axis of the drive mechanism 120, and includes a pump body 132 (e.g., chamber) that defines a chamber lumen, and a reciprocating element 131 arranged at least partially within the chamber lumen and translatable along a pump axis defined longitudinally along the chamber lumen and is normal to the rotational axis (i.e., the pump axis is perpendicular to the rotational axis of the system). The reciprocating pump further includes a return mechanism 133 (e.g., a spring) that applies a return force (e.g., a spring force) that biases the reciprocating element 131 along the pump axis towards the uncompressed position (e.g., away from the base of the chamber lumen). The return mechanism 133 is fixed to the reciprocating element 131 and the chamber, and is arranged externally to the chamber lumen (e.g., on the outside of the pump body 132). The torque regulation mechanism 150 applies a controllable torque to the eccentric mass 121, such that the controllable torque urges rotation of the eccentric mass 121 about the rotational axis. The torque regulation mechanism 150 further includes an engagement mechanism 154 (e.g., a clutch) that engages the eccentric mass 121 in at least a first and second configuration. In the first configuration, the eccentric mass 121 is mechanically coupled to the primary pump 130 (e.g., via the cam 122 and the drive coupler 140), whereas in the second configuration, the eccentric mass 121 is mechanically decoupled from the primary pump 130 (e.g., via rotational decoupling from the cam 122, mechanical decoupling from the drive coupler 140, etc.). The torque regulation mechanism 150 further includes an electric motor and a force transfer mechanism 153 (e.g., a gearbox), and the force transfer mechanism 153 is coupled between the electric motor and the eccentric mass 121 such that torques transmitted between the electric motor and the eccentric mass 121 are mechanically transferred through the gears of the gearbox. The electric motor is arranged at an offset position from the rotational axis, and the rotational axis of the electric motor (e.g., defined by an output shaft of the motor) is parallel to the rotational axis of the eccentric mass 121. The housing 110 retains the pump, the torque regulation mechanism 150, and the cam 122. The eccentric mass 121 is arranged external to the housing 110 and coupled to the cam 122 by a fixed axle that extends through an orifice 114 of the housing 110 along the rotational axis. A portion of the eccentric mass 121 is rotatable about the rotational axis along a circular path, the circular path having a radius greater than the farthest radial extent of the housing 110 (e.g., outside the perimeter of the housing no). The eccentric mass 121 is distributed along an arcuate section of the circular path (e.g., a 90° section, a 180° section, etc.).

In the second specific example above, the controller 180 is communicatively coupled to the torque regulation mechanism 150 (e.g., via a direct electrical connection, a serial data connection, a parallel data connection, a wireless data connection, etc.) and generates instructions which are provided (e.g., by the controller 180) to the torque regulation mechanism 150 to operate the system between a first and second mode. In the first mode, the drive coupler 140 is mechanically engaged with the eccentric mass 121, such that a drive force is provided to the primary pump 130 by the relative motion between the eccentric mass 121 and the primary pump 130. In the second mode, the drive coupler 140 is mechanically disengaged from the eccentric mass 121, such that no drive force is provided to the primary pump 130 by the relative motion (e.g., in cases where relative motion occurs) between the eccentric mass 121 and the primary pump 130 or by any other kinematic mechanism.

Although omitted for conciseness, the preferred embodiments include every combination and permutation of the various system components and/or method blocks.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

I claim:

1. A system for tire inflation comprising:
a drive mechanism defining a rotational axis, comprising:
an eccentric mass that offsets a center of mass of the drive mechanism from the rotational axis along a radial vector, the eccentric mass rotatable about the rotational axis;
a drive coupler having a first and second end, the first end coupled to the drive mechanism radially distal the rotational axis;
a reciprocating pump coupled to the second end of the drive coupler;
a torque regulation mechanism comprising a clutch, the torque regulation mechanism configured to apply a controllable torque to the eccentric mass, the torque regulation mechanism further configured to mechanically engage the eccentric mass and the drive coupler in a first mode, and mechanically disengage the eccentric mass and the drive coupler in a second mode; and
a controller, communicatively coupled to the torque regulation mechanism, the controller configured to operate the system between:
the first mode, wherein the controller controls the torque regulation mechanism to supply a first torque to the eccentric mass, such that the torque regulation mechanism maintains the eccentric mass at a substantially constant non-zero angle between a gravity vector and the radial vector, wherein the clutch mechanically engages the eccentric mass and the drive coupler in the first mode; and
the second mode, wherein the controller controls the torque regulation mechanism to supply a second torque to the eccentric mass, such that the torque regulation mechanism maintains the eccentric mass at a substantially zero angle between the gravity vector and the radial vector, wherein the clutch mechanically disengages the eccentric mass and the drive coupler in the second mode.

2. The system of claim 1, wherein the drive mechanism comprises a cam, wherein the cam comprises a slotted lumen that defines an interior surface, and wherein the drive coupler comprises a roller bearing captive within the slotted lumen that contacts the cam at the interior surface.

3. The system of claim 1, wherein the reciprocating pump is arranged radially distal the rotational axis of the drive mechanism, and further comprises:
a chamber defining a chamber lumen, and
a reciprocating element arranged at least partially within the chamber lumen and translatable along a pump axis normal to the rotational axis.

4. The system of claim 3, wherein the reciprocating pump further comprises a return mechanism, the return mechanism comprising a spring that applies a spring force in a direction parallel to the pump axis, the spring having a first end and a second end, wherein the first end is fixed to the pump chamber and the second end is fixed to the reciprocating element.

5. The system of claim 4, wherein the spring is arranged exterior to the pump chamber.

6. The system of claim 1, further comprising an inertial measurement unit, communicatively coupled to the controller, and attached to a non-rotating portion of the system at a point coaxial with the rotation axis, wherein the controller is configured to generate instructions based on an output value of the inertial measurement unit and control the torque regulation mechanism based on the instructions.

7. The system of claim 1, wherein the torque regulation mechanism comprises an electric motor and a force transfer mechanism, wherein the force transfer mechanism is coupled between the electric motor and the eccentric mass, and wherein the electric motor is arranged at an offset position from the rotational axis.

8. The system of claim 7, wherein the force transfer mechanism comprises a set of gears.

9. The system of claim 1, further comprising an energy storage device communicatively coupled to the torque regulation mechanism and the controller, the energy storage device operable between a harvesting mode and a powering mode, wherein the energy storage device receives energy from the torque regulation mechanism in the harvesting mode and provides energy to the torque regulation mechanism in the powering mode.

10. The system of claim 1, wherein the drive mechanism comprises a cam, wherein the system further comprises an inner housing retaining the pump, the torque regulation mechanism, and the cam, wherein the eccentric mass is arranged external to the inner housing and coupled to the cam by a fixed axle that extends through an orifice of the inner housing along the rotational axis.

11. The system of claim 10, wherein a portion of the eccentric mass is rotatable about the rotational axis along a circular path having a radius greater than a farthest radial extent of the inner housing.

12. The system of Claim 11, wherein the eccentric mass extends azimuthally along an arcuate section of the circular path.

13. The system of Claim 11, wherein the inner housing is arranged between the eccentric mass and a wheel hub coupled to the inner housing, and wherein the portion of the eccentric mass extends toward the wheel hub along a direction having a component parallel to the rotational axis.

14. A system for tire inflation comprising:
a drive mechanism defining a rotational axis, comprising:

an eccentric mass that offsets a center of mass of the drive mechanism from the rotational axis along a radial vector, the eccentric mass rotatable about the rotational axis;
a drive coupler having a first and second end, the first end coupled to the drive mechanism radially distal the rotational axis;
a reciprocating pump coupled to the second end of the drive coupler;
a torque regulation mechanism configured to apply a controllable torque to the eccentric mass, wherein the torque regulation mechanism mechanically engages the eccentric mass and the drive coupler in a first mode, and mechanically disengages the eccentric mass and the drive coupler in a second mode;
a controller, communicatively coupled to the torque regulation mechanism, the controller configured to operate the system between:
the first mode, wherein the controller controls the torque regulation mechanism to supply a first torque to the eccentric mass, such that the torque regulation mechanism maintains the eccentric mass at a substantially constant non-zero angle between a gravity vector and the radial vector; and
the second mode, wherein the controller controls the torque regulation mechanism to supply a second torque to the eccentric mass, such that the torque regulation mechanism maintains the eccentric mass at a substantially zero angle between the gravity vector and the radial vector; and
an inertial measurement unit, communicatively coupled to the controller, and attached to a non-rotating portion of the system at a point coaxial with the rotation axis, wherein the controller is configured to generate instructions based on an output value of the inertial measurement unit and control the torque regulation mechanism based on the instructions.

15. The system of claim 14, wherein the reciprocating pump is arranged radially distal the rotational axis of the drive mechanism, and further comprises:
a chamber defining a chamber lumen, and
a reciprocating element arranged at least partially within the chamber lumen and translatable along a pump axis normal to the rotational axis.

16. The system of claim 14, wherein the torque regulation mechanism comprises an electric motor and a force transfer mechanism, wherein the force transfer mechanism is coupled between the electric motor and the eccentric mass, and wherein the electric motor is arranged at an offset position from the rotational axis.

17. The system of claim 14, wherein the drive mechanism comprises a cam, wherein the system further comprises an inner housing retaining the pump, the torque regulation mechanism, and the cam, wherein the eccentric mass is arranged external to the inner housing and coupled to the cam by a fixed axle that extends through an orifice of the inner housing along the rotational axis.

18. The system of claim 17, wherein a portion of the eccentric mass is rotatable about the rotational axis along a circular path having a radius greater than a farthest radial extent of the inner housing.

19. The system of claim 14, further comprising an energy storage device communicatively coupled to the torque regulation mechanism and the controller, the energy storage device operable between a harvesting mode and a powering mode, wherein the energy storage device receives energy from the torque regulation mechanism in the harvesting mode and provides energy to the torque regulation mechanism in the powering mode.

20. A system for tire inflation comprising:
a drive mechanism defining a rotational axis, comprising:
an eccentric mass that offsets a center of mass of the drive mechanism from the rotational axis along a radial vector, the eccentric mass rotatable about the rotational axis;
a drive coupler having a first and second end, the first end coupled to the drive mechanism radially distal the rotational axis;
a reciprocating pump coupled to the second end of the drive coupler;
a torque regulation mechanism, comprising an electric motor and a force transfer mechanism, which is configured to apply a controllable torque to the eccentric mass, the torque regulation mechanism further configured to mechanically engage the eccentric mass and the drive coupler in a first mode, and mechanically disengage the eccentric mass and the drive coupler in a second mode, wherein the force transfer mechanism is coupled between the electric motor and the eccentric mass, and wherein the electric motor is arranged at an offset position from the rotational axis; and
a controller, communicatively coupled to the torque regulation mechanism, the controller configured to operate the system between:
the first mode, wherein the controller controls the torque regulation mechanism to supply a first torque to the eccentric mass, such that the torque regulation mechanism maintains the eccentric mass at a substantially constant non-zero angle between a gravity vector and the radial vector; and
the second mode, wherein the controller controls the torque regulation mechanism to supply a second torque to the eccentric mass, such that the torque regulation mechanism maintains the eccentric mass at a substantially zero angle between the gravity vector and the radial vector.

* * * * *